Feb. 2, 1937.    H. G. ROSS    2,069,506
MOTOR DRIVEN KITCHEN UTENSIL
Filed April 12, 1933    2 Sheets-Sheet 1
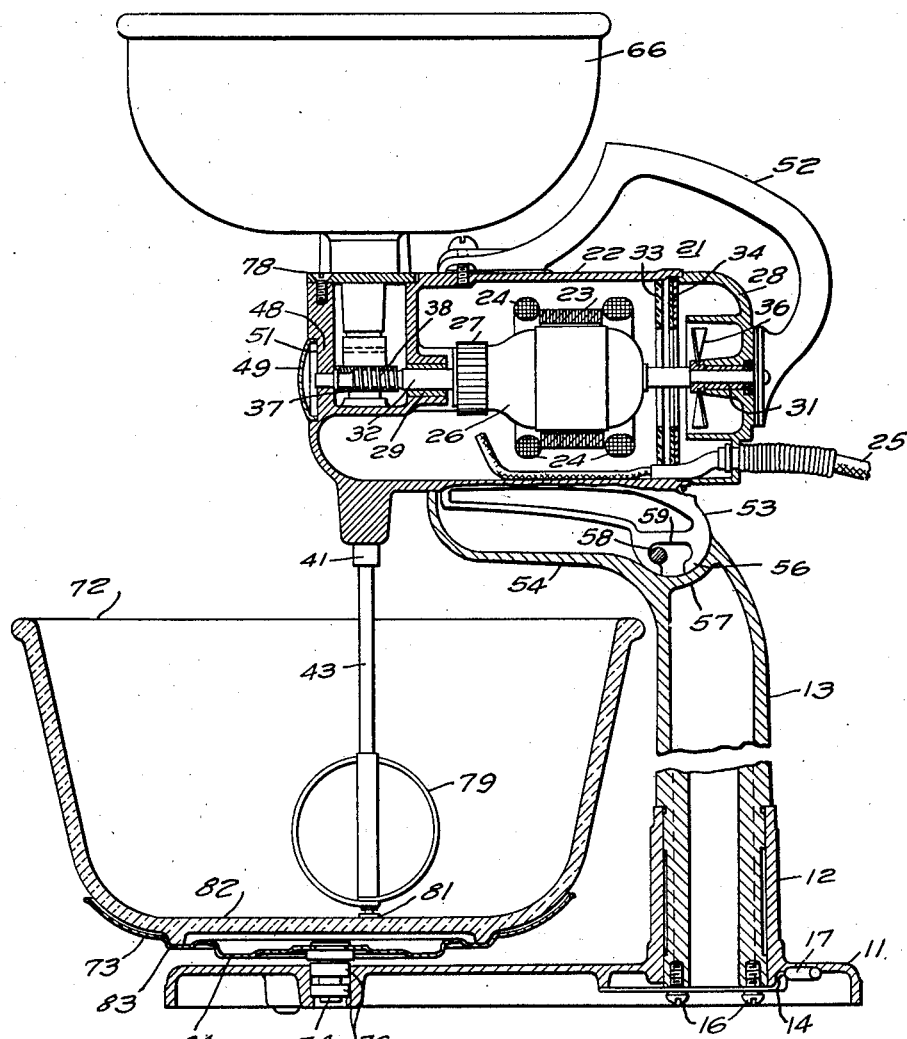
Fig. 1.
Fig. 2.
WITNESSES:
INVENTOR
Hugh G. Ross.
BY
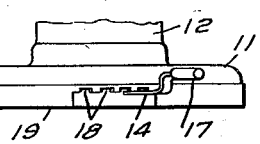
ATTORNEY

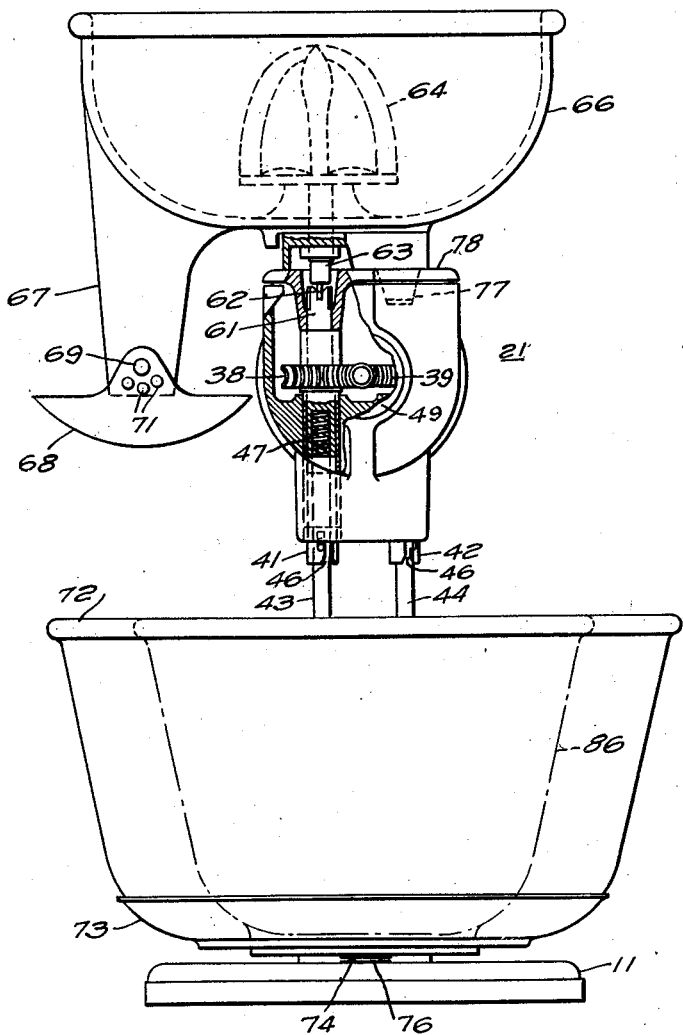

Patented Feb. 2, 1937

2,069,506

UNITED STATES PATENT OFFICE 2,069,506

MOTOR-DRIVEN KITCHEN UTENSIL

Hugh G. Ross, Ottawa, Ontario, Canada, assignor to Westinghouse Electric & Manufacturing Company, East Pittsburgh, Pa., a corporation of Pennsylvania Application April 12, 1933, Serial No. 665,720

10 Claims. (Cl. 259—84)

My invention relates to motor-driven kitchen devices and particularly to motor-driven combination kitchen utensils.

An object of my invention is to provide a relatively simple and compact motor-driven beater or mixer.

Another object of my invention is to provide a motor-driven beater that shall be operative to cause positive rotation of a bowl associated therewith and that shall also embody means to cause variations in the speed of rotation of the bowl.

Another object of my invention is to provide a motor-driven combination beater or mixer that shall embody means for driving a fruit juice extractor that may be operatively associated therewith.

Another object of my invention is to provide a motor-driven kitchen appliance in which the motor shall normally be supported in one position but shall be easily and quickly removable from its support to enable the user to hold it manually in any desired position.

Other objects will either be pointed out hereinafter or will be evident from the description of one form of device embodying my invention shown in the drawings, in which:

Figure 1 is a view, mainly in vertical section, of a device embodying my invention, Fig. 2 is a fragmentary view in side elevation showing particularly the base of my device, and Fig. 3 is a view in front elevation of my improved device, with parts broken away showing the internal construction thereof.

In practicing my invention, I provide a base, a vertical standard thereon having turning movement relatively to the base, means for turning the standard and for locking it in definite positions, and a motor supported on the standard, having two opposed limiting positions thereon, and removable therefrom in an intermediate position. A pair of beater elements depend from the motor and are driven thereby, extending into a bowl which may be turned by the differential frictional engagement of the lower ends of the beater rods with the bottom wall of the bowl, the rods being spring-pressed downwardly into engagement therewith. A juice extractor may be mounted on top of the motor and be easily and quickly removed therefrom.

In the drawings, I have indicated a base 11 which may be of relatively small depth and of substantially flattened oval shape in order that it may support not only the motor but also a bowl thereon in proper relative operative positions. The base 11 has integral therewith and located adjacent to one end thereof a short tubular upright member 12 which is adapted to receive the lower end of a vertically-extending standard 13 which is of substantially L-shape in general outline. The standard 13 and the tubular portion 12 are so machined relatively to one another that the standard 13 extends into the tubular member 12 and may have turning movement relatively thereto and while I have illustrated a particular embodiment of interfitting parts, it is obvious that other equivalent arrangements effective for the same purpose may be devised.

Turning movement of the standard 13 relatively to the base 11 may be effected by means of an actuating arm 14 which may be of substantially bar-shape and secured to the lower end of standard 13 by a pair of machine screws 16. The arrangement is such that the lower end of standard 13 projects slightly beyond the bottom wall of portion 12. A handle 17 is provided on the off-set outer end portion of arm 14, which arm may either have a struck-up portion or be made narrow enough at one part of its length to interfit selectively with any one of a plurality of recesses 18 provided in one of the depending flange portions of the base, here designated by numeral 19. The bar 14 is made sufficiently resilient to permit of pressing it downwardly in order to move it out of one of the recesses 18 after which it may be turned until it is in engagement with another one of said recesses, for a purpose to be hereinafter set forth in detail.

The upper end of standard 13 extends substantially horizontally and the upper wall portion of the standard 13 which, as may be seen from Fig. 1 of the drawings, is made hollow, is cut away in order to receive and properly support a motor assembly 21. The motor includes a housing 22, a stator 23, field coils 24 and a rotor 26 which, as shown in Fig. 1 of the drawings, may be provided with a commutator 27, so that the device may be used on either a direct current circuit or an alternating current circuit, the motor being of the so-called "universal" type, and being supplied with energy through suitable leads 25. The housing 22 has a cover member 28 at one end thereof suitably secured thereto and bearings 29 and 31 are provided in the housing 22 and the cover 28 to support the rotor shaft 32 of rotor 26. I provide further a pair of cooperating and relatively movable disks 33 and 34 having contacts thereon, (not shown) whereby to vary the speed of rotor 26 in any desired manner, either by different connections to the field coils or by the use of a resistor in the circuit. A small fan 36 may be mounted on the rotor shaft 32 and be located within the cover, suitable openings being provided in the cover and the other end of the housing so that the fan may draw air therethrough and past the rotor and the stator.

The rotor shaft 32 is provided with an integral portion having a worm thread 37 thereon, this portion being located between two worm wheels 38 and 39 in order that the rotor shaft may drive two short shaft elements 41 and 42 in opposite directions.

Members 41 and 42 are made of tubular shape in order that two beater rods 43 and 44 may be operatively associated therewith by being fitted into the members 41 and 42 and held therein by any suitable means here shown as a bayonet joint 46, shown more particularly in Fig. 3 of the drawings. A helical spring 47 is located within each tubular element 41 and 42, the upper end of the beater rods compressing these, not only to make the bayonet joint interlock more effectively, but also for a purpose to be hereinafter described. Any suitable or desired bearing structure for driven elements 41 and 42 may be provided and as such are old in the art no detailed description thereof is believed to be necessary.

The extreme outer end of rotor shaft 32, beyond that portion having worm threads 37 thereon, is located in the end wall 48 of the housing 22 which provides a bearing therefor and a cover disk 49 may be utilized to cover up the outer end of shaft 32 and for this purpose may be resiliently fitted into a depression 51 in portion 48.

As it is desired to be able to remove the motor structure proper from the base and standard so that an operator may hold the same in his or her hand during use thereof, I provide a handle 52, as shown in Fig. 1 of the drawings. The motor housing 22 has a lower or depending portion 53 which has interfitting engagement in the substantially horizontally extending portion 54 of standard 13 so that the weight of the motor will tend to hold it in proper operative position relatively to portion 54. In order to provide further interlocking engagement, the portion 53 has a substantially spherical or arcuate portion indicated by numeral 56 in Fig. 1 of the drawings, which fits with a cooperating seat 57 in the standard and a pin 58 is fixedly mounted in and extends across the rear portion of part 54, the portion 56 of the motor having a recess 59 therein with a reduced width of opening as shown more particularly in Fig. 1 of the drawings. The configuration of recess 59 is such that when the motor shaft is horizontal, the pin 58 will be in the position shown, at one end or side portion of recess 59.

When it is desired to have the motor shaft extend vertically, the motor may be tilted backwardly, from the position shown in the drawings, (Fig. 1), until the pin 58 is located at the other end portion of recess 59. It is obvious that the motor structure and the beater rods may be removed from standard 13 when the motor is in an intermediate position, when the pin 58 will move freely out of the recess 59.

Driven member 41 may be provided with an upwardly extending portion 61 which may have a slot in its upper end to receive a projection 62 at the lower end of a driven shaft 63, at the upper end of which is mounted a reamer 64 which is part of a juice extractor. The juice extractor includes further a bowl 66 having a down spout 67 which has supported thereon a drip catcher 68, of trough-shape, which is pivotally mounted on the spout 67 as by cooperating projections and recesses on each side thereof which are indicated generally by the numeral 69. A plurality of substantially similar cooperating recesses and projections 71 at one side of the spout and the drip catcher 68 enables the user to either locate the drip catcher 68 in the position shown in Fig. 3 of the drawings, or in a forwardly or in a backwardly tilted juice-guiding position. The user is thus enabled to cause juice extracted from citrous fruits to flow into a glass set beside the device or into a bowl 72, which bowl is located on a rotatable dished member 73, or to use it as a means for catching the last few drops of juice. The dished member 73 is rotatably supported on a short shaft 74 and a plurality of ball bearings 76.

The juice extractor assembly is such as to provide a depending lug 77, shown in Fig. 3 of the drawings, which fits into a recess in a top plate 78 secured to the outer end of housing 22 to provide a flat support for the juice extractor. The lug 77 interfitting with the second recess precludes turning movement of the extractor on the plate 78 while in use.

Each of the beater rods 43 and 44 is provided with a plurality of bowed members 79, made of wire or strips of a suitable resilient material, which may be bent to be substantially circular in outline or the same may be bent to more or less oval outline. Each of the beater rods has a substantially flat bottom end indicated by numeral 81 in Fig. 1 of the drawings, which bottom end is resiliently pressed against the bottom wall 82 of a bowl, which bottom wall may be slightly tapered downwardly from the central portion thereof.

Referring to Fig. 3 of the drawings, it will be noted that the two beater rods 43 and 44 are located at substantially equal distances away from a vertical plane passing through the center of the bowl. It is evident, therefore, that if the two beaters are being operated in different directions, no turning movement of the bowl will result because of the frictional driving engagement of the end portion 81 with the upper surface of bottom wall 82. A user of the device can, therefore, beat, stir or mix material in the bowl without causing any turning movement of the bowl. If, however, he should desire to effect turning movement of the bowl, this can be done by effecting a turning movement of standard 13 by means of arm 14, so that the two beater rods will be located eccentrically of the central portion of the bowl. As was stated above, the two beater rods rotate in opposite directions but the length of the effective lever arm of one of the beater rods is greater than that of the other beater rod (that is when they are moved eccentrically relatively to the center of the bowl) and a turning movement of the bowl will result, which turning movement may be varied by turning movement of the standard on the base. I, therefore, provide a plurality of small recesses 18 at each side of that recess which locates the beater rods centrally of the bowl, so that I can obtain either a relatively slow rotation of the bowl or a rotation at a somewhat higher speed. It is further obvious that the bowl may be rotated by the frictional engagement therewith of only one rotating element.

The bowl support 73 is provided with a pair of concentric annular recesses 83 and 84, as shown in Fig. 1 of the drawings, in order that a large bowl, as indicated by numeral 72, may be used or so that a smaller bowl indicated by numeral 86 in Fig. 3 of the drawings can be used.

The device embodying my invention thus provides a relatively simple and compact motor-driven kitchen appliance for beating, stirring or mixing different kinds of materials and in which the beaters themselves by differential frictional engagement with the top surface of the bottom wall of a freely rotatable bowl, cause rotation of the bowl.

I may here point out that it is also possible to use the device embodying my invention and particularly the bowed members 79 to remove material in the bowl from the upper inner surface thereof. To do this, it is only necessary that the operator or user tilt the motor on its support holding it in its arcuate seat by the handle 52, and at the same time effect the proper amount of turning movement by use of arm 14 so that the bowed members 79 will lightly engage the inner surface of the bowl below the upper edge thereof, whereby material which may adhere thereto can be easily and quickly removed from the bowl surface.

Various modifications may be made in the device embodying my invention without departing from the spirit and scope thereof, and I desire, therefore, that only such limitations shall be placed thereon as are imposed by the prior art or are set forth in the appended claims.

I claim as my invention:

1. In a motor-driven kitchen utensil, a base, a vertically-extending standard thereon, a motor on the standard, a beater depending from and driven by the motor, a container for material to be mixed or beaten receiving the beater, an arm secured to the standard for turning the same through a predetermined angular distance and means on the base cooperating with the arm to lock the same in adjusted position.

2. In a motor-driven kitchen utensil, a base, a standard thereon, a motor on the standard, a beater depending from and driven by the motor, a container for material to be beaten or mixed receiving the beater, a freely rotatable support on the base for the container, an arm secured to the standard and cooperating with the base to turn the standard, the motor and the beater through a predetermined angular distance and lock the same in such position.

3. In a motor-driven kitchen utensil, a base, a freely-rotatable bowl support on the base, a standard on the base, a motor on the standard, a pair of relatively rotatable beater elements depending from and driven in opposite directions by the motor for stirring material in a bowl located on the bowl support and for causing rotation thereof by direct contact and differential action of both beater elements therewith and means secured to the standard for moving the same to stop rotation of the bowl while maintaining said contact.

4. In a motor-driven kitchen utensil, a base, a freely-rotatable bowl support on the base, a standard on the base, a motor on the standard, a pair of beaters depending from and driven by the motor in opposite directions for stirring material in a bowl located on the bowl support, the bottom ends of the beaters operatively engaging the bottom wall of the bowl to cause rotation of the bowl by differential frictional action thereon.

5. In a motor-driven kitchen utensil, a base, a freely-rotatable bowl support on the base, a standard on the base, a motor on the standard, a pair of beater elements depending from and driven in opposite directions by the motor for stirring material in a bowl located on the bowl support and for causing rotation of the bowl by direct contact and differential action of both beater elements therewith and means secured to the standard to move the same to cause variations in the speed of rotation of the bowl.

6. In a motor-driven kitchen utensil, a base, a freely-rotatable bowl support on the base, a vertical standard on the base, a motor on the standard and a pair of yieldingly mounted beater rods depending from and driven by the motor, the lower ends of said beater rods being adapted to frictionally engage the bottom wall of a bowl located on the bowl support to cause rotation thereof by differential frictional action thereon.

7. In a motor-driven kitchen utensil, a base, a vertical standard thereon, a motor supported on the standard and cooperating means on the motor and on the standard for holding the motor on the standard in two opposed limiting positions and for enabling removal of the motor from the standard in an intermediate position.

8. In a motor-driven kitchen utensil, a base, a vertical standard thereon having a recess in its upper surface, a motor assembly adapted to rest in the recess, a pin and an overhung slot in the standard and the motor assembly respectively for holding the motor assembly in its normal operative position on the standard.

9. In a motor-driven kitchen utensil, a base, a vertical standard thereon having a recess in its upper surface, a motor assembly adapted to rest in the recess, a pin and an overhung slot in the standard and the motor assembly for holding the motor on the standard in two opposed limiting positions and for enabling removal of the motor assembly from the standard in an intermediate position.

10. In a motor-driven kitchen utensil, a base, a freely-rotatable bowl support on the base, a standard on the base, a motor on the standard, a pair of beater elements depending from and driven by the motor in opposite directions for stirring material in a bowl located on the bowl support, the beater elements operatively engaging the bowl at different points to cause rotation thereof by differential frictional action thereon.

HUGH G. ROSS.